Patented Aug. 27, 1946

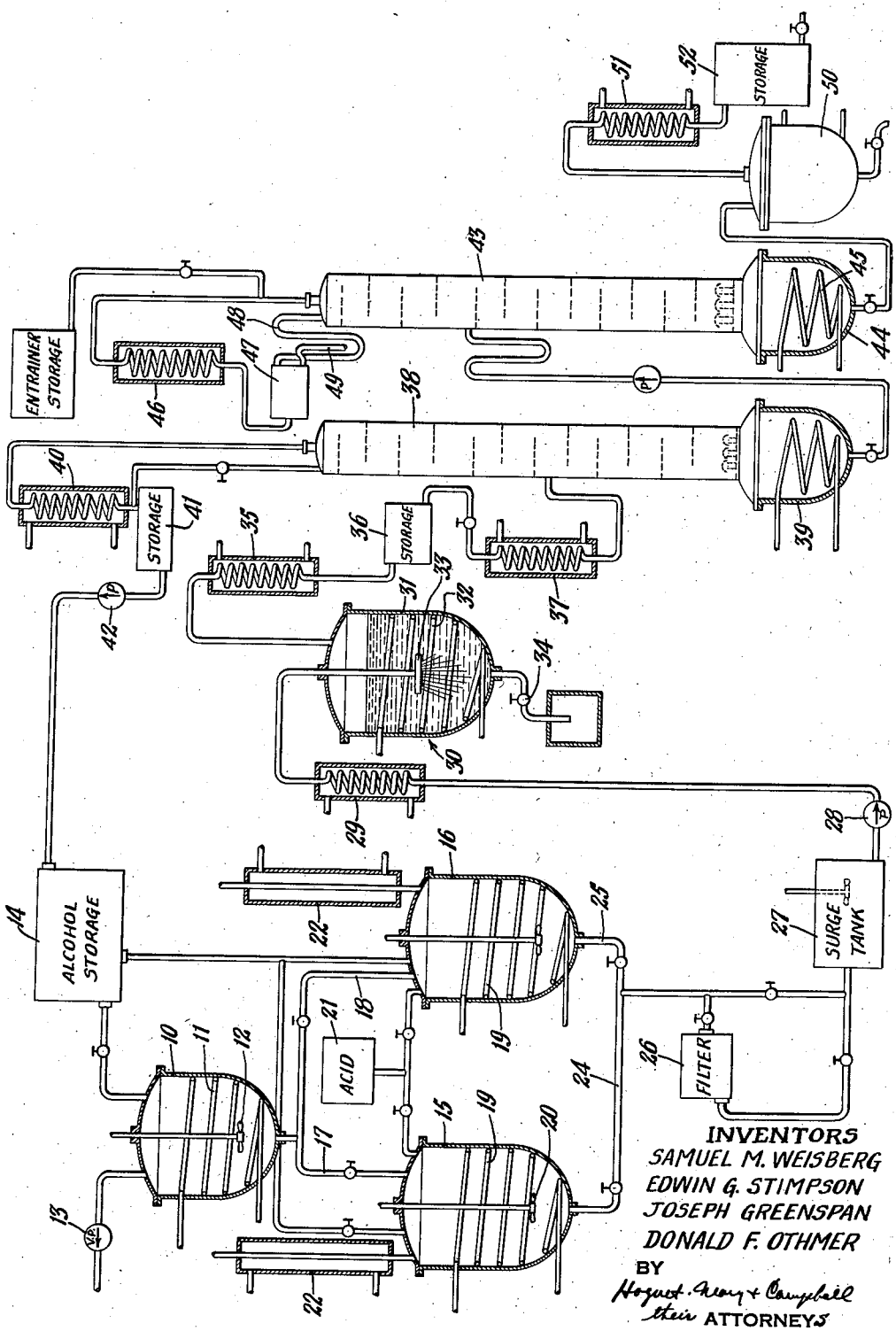

2,406,648

UNITED STATES PATENT OFFICE 2,406,648

PROCESS OF PREPARING WATER-SOLUBLE ALKYL LACTATES

Samuel M. Weisberg, Edwin G. Stimpson, and Joseph Greenspan, Baltimore, Md., and Donald F. Othmer, Brooklyn, N. Y., assignors to Sealtest, Inc., Baltimore, Md., a corporation of Maryland Application December 8, 1942, Serial No. 468,184

6 Claims. (Cl. 260—484)

This invention relates to the manufacture of water-soluble esters of lactic acid, and particularly, to the preparation of such esters in a substantially water-free or anhydrous form.

Esters of lactic acid which are substantially water-insoluble, for example, butyl lactate, have been produced in relatively large quantities for use as lacquer solvents and for other purposes. Because of the relative insolubility of such esters in water, little difficulty is encountered in producing them in a substantially anhydrous state.

Quite a different situation arises when it is desired to produce water-soluble esters of lactic acid in an anhydrous form. According to the prior methods of preparing such water-insoluble esters, water is unavoidably formed or is present during esterification. As pointed out in the Weisberg et al. Patent No. 2,290,926, dated July 28, 1942, such water-soluble esters of lactic acid form constant boiling mixtures with water and, therefore, they cannot be separated by simple rectification or distillation. This is not particularly disadvantageous when such water-soluble esters are prepared as an intermediate product in the manufacture of lactic acid, but it does make difficult the production of anhydrous water-soluble esters.

A demand now exists for large quantities of anhydrous water-soluble lactates, for example, methyl, ethyl and iso-propyl lactates and it is, accordingly, an object of the present invention to provide a commercially practical method of producing such esters.

Another object of the invention is to provide a commercially practical method of obtaining substantially pure, water-soluble esters of lactic acid.

A further object of the invention is to provide a process which has a higher efficiency and high yields on a commercial basis.

An additional object of the invention is the provision of a process that is adapted for operation with crude and unpurified raw material but which, nevertheless, results in a pure final product.

Still another object of the invention is to provide a process that is more or less continuous in operation and in which each of the steps or operations is related to the process as a whole so that the process may proceed with a minimum amount of attention and handling of the material and so as to produce a continuous supply of the finished material.

Another object of the present invention is to provide a method wherein esterification of a salt of lactic acid and a lower alkyl alcohol, the lactate ester of which is water-soluble, is carried forward in the presence of a minimum amount of water.

Another object of the invention is to provide a method wherein the water unavoidably present or formed during the preparation of water-soluble esters of lactic acid can be removed expeditiously and substantially completely from the ester.

A further object of the invention is to provide a method of preparing substantially anhydrous, water-soluble esters of lactic acid in which objectionable by-products are separated without substantial loss of or contamination of the ester.

An additional object of the invention is the provision of a method in which filtration of the ester from the sludge is not essential thereby greatly facilitating the operation.

Other objects of the invention will become apparent from the following description of typical methods and apparatus used in practicing the invention.

In general, a method in accordance with the present invention includes esterifying an alkali metal or alkaline earth metal lactate with a lower alkyl alcohol, the lactate ester of which is water-soluble such as, for example, methyl, ethyl, or isopropyl alcohol, in the presence of a strong mineral acid. During the formation of the ester, the action of the acid on the lactate salt unavoidably causes the formation of an alkali or alkaline earth metal salt, which with impurities in the lactate salt raw material forms a sludge which has the tendency to occlude and retain tenaciously a portion of the ester. The method of the present invention includes flash distillation of the ester, any excess alcohol and the water present or formed during esterification under conditions such that a clean separation of the liquid from the sludge is obtained. The liquid components may then be distilled to separate the alcohol from the aqueous solution of the ester and the water is then distilled off azeotropically to produce a substantially pure anhydrous ester.

For a better understanding of the procedural steps involved in practicing the method, reference may be had to the accompanying drawing in which the single figure is a diagrammatic illustration of a typical flow sheet of the process.

In a typical method used in the production of methyl lactate, for example, the vacuum pan 10 may be charged with crude sodium lactate. The vacuum pan 10 is provided with a steam coil 11 and an agitator 12 and is connected to a vacuum pump 13 for reducing the pressure in the chamber so that the water may be separated from the crude sodium lactate without danger of decomposition of the latter. A major proportion of the water is removed at this point for the reasons that the esterification reaction goes to completion more rapidly in the presence of smaller quantities or in the absence of water, and elimination of water at this point reduces the amount that must be separated from the ester to produce the anhydrous ester.

The lactate salt is generally obtained from fermentations yielding lactic acid and may contain impurities such as proteinaceous and other organic materials. The grade known as "crude" which is not highly refined, may be used advantageously and economically in our process. Crude sodium lactate, for example, is in the form of a syrup containing about 30% to 80% lactate salt and the balance substantially water. The viscosity of the syrup increases with a decrease in temperature. A concentration of 70% is about as high as is convenient for handling the crude sodium lactate under ordinary circumstances. The crude sodium lactate may be concentrated under a vacuum of about 22" to 29" in order to produce a nearly water-free material. At the elevated temperature used, this may be agitated, but not in the cold. The extent of dehydration is not critical for reasons which will become apparent hereinafter. The esterifying plant may utilize other anhydrous lactate salts as the raw material, but these may be difficult to handle because of their very viscous nature or because they are solids. The amount of water removed prior to the esterification will involve a balance between facility of handling, climatic conditions, cost of transportation, etc.

At the conclusion of the dehydrating operation and while agitation is continued, a small amount of alcohol may be drawn into the vacuum pan 10 from the alcohol storage tank 14, in order to make the mixture fluid, even at lower temperatures, so that it can be readily discharged from the vacuum pan. In the formation of methyl lactate, for example, a little methyl alcohol may be mixed with partially or completely dehydrated lactate salt. Anhydrous crystalline salts may be dissolved or suspended directly in the alcohol.

The mixture may then be delivered to one or more esterification kettles 15, 16, at least two preferably being used in order to permit continuous production of the ester. The vacuum pan 10 may be connected to the kettles 15 and 16 by means of suitable valved conduits 17 and 18 permitting discharge selectively to either of the kettles. The kettles 15 and 16 are provided with a steam heating coil 19 or other heating means and an agitator 20 in order to heat the esterification mixture to the desired temperature. Each of the kettles is provided with a reflux condenser 22 in the usual way.

A strong mineral acid, such as sulfuric acid, may be delivered to the esterification kettles 15 and 16 from the acid storage tank 21. Alcohol is delivered to each of the kettles 15 and 16 from the alcohol storage tank 14.

The mixture of lactate salt, alcohol and acid is esterified by agitating the ingredients and heating so that refluxing in the condenser 22 is maintained. This is continued until esterification proceeds substantially to completion, which under the conditions to be described is about half an hour.

In order to obtain substantially quantitative yields economically, it is necessary to control the pH value of the esterification mixture within relatively close limits and to control the proportions of the alcohol and the lactate salt.

We have discovered that if the pH value of the reaction mixture exceeds 1.4, the reaction will not go to completion. Similarly, if a pH value less than about 0.7 is maintained, the reaction is slower and a longer time and greater amounts of steam are required to complete the reaction. Moreover, the excess acid must be neutralized after esterification is ended with the formation of an excess of water and the use of an excessive amount of alkali. It is preferred for economic reasons not to go below a pH value of 1.0, but if the economic factor is not important, the pH value may go as low as 0.7 or even lower. The pH value method of control is to be distinguished from prior proposals in which the amount of acid was expressed in terms of per cent and calculated by titrimetric determinations. This latter method is indefinite and unsatisfactory because of the varying composition of the crude raw material, the varying amounts of water present and other uncontrollable and non-ascertainable factors, as well as the fact, as now discovered, that it is the hydrogen ion concentration that is effective in causing the reaction to go to completion rather than any given amount of acid.

The amount of alcohol used to assure complete esterification of the lactic acid may vary between 3 parts and 6 parts by weight for each part of lactate salt calculated on a 100% basis. The optimum ratio, considering the thermal economics involved, is about 4 to 1. When less than 3 parts by weight of alcohol are used, the reaction does not go to a satisfactory completion and when more than 6 parts by weight of alcohol are used, the excess alcohol serves no useful purpose and must be removed by distillation later, thereby increasing the cost of the product.

During the formation of the ester, a sludge is formed; this is primarily sodium sulfate when sodium lactate and sulfuric acid are used in the esterification reaction. The ester must be separated from the sludge and this has in the past involved great difficulty because the sludge has a tendency to occlude and retain a relatively large proportion of the ester. Moreover, upon neutralization of the excess acid, an additional amount of salt is formed. This is admixed with the organic impurities originally present in the crude ester.

Upon completion of the esterification reaction, the mixture may be neutralized to a pH value of about 6.5 to 7.5 with a suitable alkali, such as soda ash or caustic. The esterification mixture which comprises the ester, water, the excess alcohol, and the sludge may be withdrawn through the conduits 24 or 25 to a filter press 26 or directly to a surge or storage tank 27 where the mixture may be agitated to prevent settling of the sludge. As indicated, the filter press 26 may be arranged in a parallel circuit and can be used or disregarded as may be desired. In view of the subsequent treatments, it usually is unnecessary to use a filter.

In order to recover the ester from the sludge, without the addition of water, the liquid constituents are separated from the sludge by a flash distillation to cause the removal of substantially all of the liquid components at temperatures below the boiling points of the ester.

This flash distillation may be accomplished by withdrawing the mixture of water, sludge, alcohol and ester from the surge or storage tank 27 by means of a pump 28 and delivering it through a preheater 29 to the flash distilling device 30. This device includes a kettle 31 having a steam coil 32 or other heating means therein and which is adapted to be filled partially with a liquid having a boiling point higher than the ester and in which the ester is practically insoluble. A mineral base oil having a viscosity of 105° to 110° Saybolt at 100° F. has been found to be entirely satisfactory.

The esterified mixture is preferably delivered into the oil by means of a spray head 33 disposed beneath the surface of the oil so that very rapid heating and vaporization of the liquid components of the esterified mixture takes place. The insoluble sludge carried into the kettle 31 settles to the bottom and may be withdrawn continuously or intermittently through the valve 34. It will be understood that the crude ester may be brought into contact with the heated liquid in other ways, for example, by spraying the ester and the oil into contact with each other. The ability to separate the sludge in this manner generally renders it unnecessary to filter the sludge. Since filtration is a messy and time-consuming operation, especially when crude lactate salts containing organic materials are used, the advantages of the distilling operation will be readily apparent. In addition, this method renders it possible to use more crude and less expensive raw materials.

The temperature of the oil in the kettle is maintained sufficiently low to avoid charring or decomposition of any components of the esterified mixture, but sufficiently high to vaporize the ester, alcohol and water almost instantaneously. The temperature of the oil preferably is maintained between about 85° C. and 145° C. when distilling methyl lactate. Higher temperatures may be used, but this may be undesirable as charring of some components of the mixture may occur. The oil may be maintained at the desired temperature by the use of steam circulated through the coil 32 or by any other desired type of heating means. Despite the fact that methyl lactate boils at 144° C., the vapors of alcohol and methyl lactate and the water vapor leave the oil at about 80° to 100° C. It appears that the large volume of alcohol vapor acts to sweep out and entrain the methyl lactate and such water as is present.

The vapors escaping from the kettle 31 carrying the ester are delivered to a condenser 35 and the condensate passes from the condenser to a storage or surge tank 36. At this stage of the process the condensate comprises water, alcohol and methyl lactate which have been separated simultaneously from the esterification mixture with great efficiency and substantially uncontaminated.

From the tank 36, the condensed liquid may be passed to a preheater 37 and then to a fractionating column 38 having a still kettle 39 at the bottom thereof, containing a steam coil or other equivalent heating means. This still is operated in such a fashion as to distill off the alcohol which is drawn off near the top of the column, delivered to a condenser 40 and thence returned through a surge or storage tank 41 to the alcohol storage tank 14 by means of a pump 42 or by gravity if the condenser is located above the storage tank. A portion of the alcohol may be returned to the column 38 as reflux.

The fraction containing the ester and water is withdrawn as a liquid from the bottom of the column 38 and delivered to a second fractionating column 43 having a still bottom 44 containing a heating coil 45 or any other suitable heating means.

In the fractionating column 43, the ester and water are mixed with a suitable entrainer capable of forming an azeotropic mixture with water. Entrainers found suitable for separation of the water are organic liquids which are relatively insoluble in water, but which in a vapor form, form a constant boiling mixture with water having a boiling point lower than the boiling points of the ester, the constant boiling mixture of water and the ester, and the boiling point of any azeotropic mixture of the ester and the entrainer.

The entrainer may be any one of a number of compounds. Many water-insoluble alcohols, ethers, ketones, hydrocarbons and esters are entirely satisfactory. Among the alcohols found useful are butanol, iso-butyl alcohol and primary iso-amyl alcohol. Among the hydrocarbons found useful are benzene and toluene. Among the ethers that are useful are di-butyl ether and di-iso-butyl ether. Among the ketones that are satisfactory are methyl iso-propyl ketone, methyl iso-butyl ketone and methyl-n-amyl ketone. Also alkyl halides may be used satisfactorily.

The characteristics of typical representatives of some of the groups enumerated above in separating water azeotropically from aqueous methyl lactate solutions are indicated in the following table:

| Name of entrainer | I Methyl isobutyl ketone | II n-Butyl alcohol | III Methyl n-amyl ketone | IV 2-methyl butanol-4 |
|---|---|---|---|---|
| Comp. of feed, percent methyl lactate | 59.2 | 59.2 | 59.8 | 59.8 |
| Percent methyl lactate in discarded water | 0 | 0 | 3.73 | 0.0078 |
| Percent methyl lactate in entrainer | 0 | 0 | 0.13 | 0.0078 |
| Feed, ml./minute | 24 | 26 | 14 | 18 |
| Water separated, ml./minute | 9 | 10 | 5.5 | 6 |
| Percent lactic acid in residue | 0.014 | 0.009 | 0.009 | 0.009 |
| Temp. ° C. at the bottom of the column | 148 | 145 | 146 | 146 |
| Temp. ° C. at the top of the column | 87 | 92 | 94.5 | 93.5 |
| Azeotropic temperature ° C | 87 | 92 | 94.5 | 93.5 |
| Entrainer #/# water in azeotropic mixture | 3.11 | 1.63 | 1.30 | 1.01 |
| Solubility in water | 1.9 20°C. | 9 15°C. | 0.4 20°C. | 2 14°C. |

All of the above disclosed entrainers form, with water, azeotropic mixtures having boiling points less than about 100° C., the boiling point of a constant boiling mixture of water and methyl lactate.

The azeotropic mixture of water and the entrainer is vaporized and is drawn off at the top of the column 43 and delivered to a condenser 46 where it is condensed and delivered to a decanter tank 47. Inasmuch as the entrainer is insoluble in water and lighter than water, the entrainer will collect in a stratum above the water and may be returned by means of a suitable conduit 48 to the fractionating column 43. The lower layer of water may likewise be withdrawn by means of a suitable conduit 49 and either discharged as waste or treated in a stripping column to recover any entrainer that may be carried over with the water.

The ester may be drawn off at the bottom of the column 43 and delivered to a still pot 50 where it is further distilled, to separate the ester from higher boiling components, condensed in the condenser 51 and delivered to storage 52.

Analysis of the products produced in accordance with the above-described method shows that the esters are between 99.8 and 100% pure.

A typical example of our process, including yields of the components at various stages of the process is as follows:

Crude sodium lactate containing about 30% water is introduced into the vacuum pan and dehydrated under 22 to 29 inches of vacuum until substantially all of the water is removed. Heating is discontinued and a small amount of methyl alcohol is added to render the mixture fluid.

The alcohol, sodium lactate mixture is then discharged into an esterification kettle 15 or 16 where about four parts by weight of methyl alcohol for each part by weight of sodium lactate, calculated on a basis of 100% sodium lactate, are added. The pH value of the mixture is adjusted to and maintained at about 1.4 while the mixture is heated with refluxing until esterification is complete. This generally requires about one-half hour.

The esterification mixture is then neutralized, the pH value is adjusted to about 7.5, and the mixture is delivered to the flash vaporizer.

In a flash vaporizer of the type disclosed in the figure, containing about 5 gallons of mineral base oil heated by steam at about 100 pounds gauge pressure, vaporization takes place almost instantly when the esterified mixture is fed at the rate of twenty gallons per hour. A residue of sludge is formed at the rate of about one gallon per hour and distillate is removed at the rate of about nineteen gallons per hour, the distillate consisting of fifteen gallons of alcohol, two gallons of ester and two gallons of water.

The distillate, after condensation, is redistilled to remove the excess alcohol and the water and ester are withdrawn for azeotropic distillation.

In this operation, approximately twelve pounds of methyl iso-butyl ketone are placed in the still pot and the aqueous methyl lactate solution is fed into the column at a rate such that the water take-off approximately equals the amount of water being fed to the column. When approximately twenty-five gallons of the ester solution have been fed to the column, the feed is discontinued and the water remaining in the column is distilled off. When the temperature at the top of the column rises above the azeotropic boiling point of 87° C., the water is substantially eliminated. Distillation is continued, withdrawing the ketone continuously, until the temperature at the still pot is about 145° C. at which time the substantially pure methyl lactate is drawn off at the bottom of column. The ester distillate is delivered to the still pot, where the methyl lactate is further distilled to between about 99.8 and 100% purity. It will be understood, of course, that the azeotropic distillation column can be operated continuously by supplying the entrainer and the aqueous solution of the ester continuously to the column and continuously withdrawing the anhydrous ester from the bottom of the column.

It will be apparent that the production of the purified methyl lactate or other lactic acid ester can be conducted continuously by the above described process and that high, in fact, almost quantitative yields of the ester can be obtained. Of course, the process may be varied as to the quantities of ester produced, the capacity of the system, and the type of apparatus used in practicing the operations. Therefore, the above described example and apparatus should be considered as illustrative and not as restricting the scope of the invention as defined in the following claims.

We claim:

1. A method of manufacturing water-soluble esters of lactice acid in substantially anhydrous form, comprising esterifying a mixture of a salt of lactic acid of the group consisting of alkali metal and alkaline earth metal lactates with an excess of an alkyl alcohol of the class consisting of methyl, ethyl and isopropyl alcohols in the presence of a strong mineral acid, maintaining the pH value between about 0.7 and 1.4 during esterification, substantially neutralizing the mixture after completion of esterification, flash-distilling water, alcohol and ester from said mixture by spraying the mixture into contact with oil at a temperature above the boiling point of water and less than the decomposition temperature of the ester, distilling the alcohol from the water and the ester, mixing the ester and the water with an organic compound forming an azeotropic mixture with water having a boiling point of less than 100° C. and distilling the azeotropic mixture to separate the water from the ester.

2. A method of manufacturing a water-soluble ester of lactic acid in substantially anhydrous form, comprising heating and agitating a mixture of sodium lactate and an excess of methyl alcohol in the presence of sulfuric acid while maintaining the pH value of the mixture between about 0.7 and 1.4 to produce a mixture of methyl lactate, water, methyl alcohol and a sludge containing sodium sulphate; spraying the last-mentioned mixture into contact with a heated liquid having a boiling point higher than the boiling point of methyl lactate to flash vaporize the alcohol, water and methyl lactate; condensing the vapors and distilling the alcohol from the solution of water and methyl lactate; mixing the solution with a water-insoluble entrainer forming with water an azeotropic mixture having a boiling point less than 100° C. and distilling off the azeotropic mixture to produce substantially anhydrous methyl lactate.

3. A method of manufacturing a water-soluble ester of lactic acid in substantially anhydrous form, comprising heating and agitating a mixture of sodium lactate and an excess of methyl alcohol in the presence of sulfuric acid while maintaining the pH value of the mixture between about 0.7 and 1.4 to produce a mixture of methyl lactate, water methyl alcohol and a sludge containing sodium sulphate, spraying the last-mentioned mixture into contact with a heated liquid having a boiling point exceeding about 145° C. to flash vaporize the alcohol, water and methyl lactate, condensing the vapors and distilling the alcohol from the water and methyl lactate; forming an azeotropic mixture of methyl iso-butyl ketone and the water and distilling off the azeotropic mixture to produce substantially anhydrous methyl lactate.

4. A method of manufacturing a water-soluble ester of lactic acid in substantially anhydrous form, comprising at least partially drying crude sodium lactate, heating and agitating a mixture of about one part by weight of the dried sodium lactate and about three to six parts of methyl alcohol in the presence of sulfuric acid while maintaining the pH value of the mixture between about 0.7 and 1.4 to produce a mixture of methyl lactate, water, methyl alcohol and a sludge containing sodium sulphate, spraying the last-mentioned mixture into contact with heated oil at a temperature sufficiently high to flash vaporize the alcohol, water and methyl lactate and separate them from the sludge; condensing the vapors and distilling the alcohol from the water and methyl lactate, forming an azeotropic mixture of methyl iso-butyl ketone and the water and distilling off the azeotropic mixture to produce substantially anhydrous methyl lactate.

5. A method of manufacturing water-soluble esters of lactic acid in substantially anhydrous form, comprising esterifying a mixture of a salt of lactic acid of the group consisting of alkali metal and alkaline earth metal lactates with an excess of an alkyl alcohol of the class consisting of methyl, ethyl and isopropyl alcohols, in the presence of sulfuric acid, maintaining the pH value between about 0.7 and 1.4 during esterification, flash-distilling water, alcohol and ester from said mixture by spraying the mixture into contact with oil maintained at a temperature above the boiling point of water and less than the decomposition temperature of the ester, distilling the alcohol from the water and the ester, mixing the ester and the water with an organic compound forming an azeotropic mixture with water having a boiling point less than 100° C. and distilling the azeotropic mixture to separate the water from the ester.

6. A method of manufacturing water-soluble esters of lactic acid in substantially anhydrous form, comprising esterifying a mixture of a salt of lactic acid of the group consisting of alkali metal and alkaline earth metal lactates with an excess of an alkyl alcohol of the class consisting of methyl, ethyl and isopropyl alcohols, in the presence of sulfuric acid, maintaining the pH value between about 0.7 and 1.4 during esterification, flash-distilling water, alcohol and ester from said mixture by bringing said mixture into contact with a heated medium maintained at a temperature above the boiling point of water and less than the decomposition temperature of the ester, distilling the alcohol from the water and the ester, mixing the ester and the water with an organic compound forming an azeotropic mixture with water having a boiling point less than 100° C. and distilling the azeotropic mixture to separate the water from the ester.

SAMUEL M. WEISBERG.
EDWIN G. STIMPSON.
JOSEPH GREENSPAN.
DONALD F. OTHMER.